United States Patent
de Groen et al.

(10) Patent No.: US 10,959,567 B2
(45) Date of Patent: Mar. 30, 2021

(54) DEVICE FOR PREPARING A COFFEE PRODUCT

(71) Applicant: J.M. DE JONG DUKE AUTOMATENFABRIEK B.V., Sliedrecht (NL)

(72) Inventors: Cornelis de Groen, Hendrik Ido Ambacht (NL); Eduard Adri Brijder, Gorinchem (NL)

(73) Assignee: J.M. DE JONG DUKE AUTOMATENFABRIEK B.V., Sliedrecht (NL)

( * ) Notice: Subject to any disclaimer, the term of this patent is extended or adjusted under 35 U.S.C. 154(b) by 232 days.

(21) Appl. No.: 15/965,024

(22) Filed: Apr. 27, 2018

(65) Prior Publication Data

US 2018/0317701 A1 Nov. 8, 2018

(30) Foreign Application Priority Data

Apr. 28, 2017 (NL) .................... 2018804
Apr. 26, 2018 (NL) .................... 2020838

(51) Int. Cl.
*A47J 31/52* (2006.01)
*A47J 31/46* (2006.01)
(Continued)

(52) U.S. Cl.
CPC ....... *A47J 31/5255* (2018.08); *A47J 31/0605* (2013.01); *A47J 31/3671* (2013.01); *A47J 31/46* (2013.01); *A47J 31/461* (2018.08)

(58) Field of Classification Search
CPC .... A47J 31/5255; A47J 31/0605; A47J 31/46; A47J 31/461; A47J 31/3671
See application file for complete search history.

(56) References Cited

U.S. PATENT DOCUMENTS

2010/0064900 A1 3/2010 Reyhanloo
2018/0255961 A1* 9/2018 Vetterli ................. F16K 1/38

FOREIGN PATENT DOCUMENTS

CA 2998560 A1 * 3/2017 .......... A47J 31/0657
DE 202006014317 U1 2/2008
(Continued)

OTHER PUBLICATIONS

Machine translation of Haverkamp, DE 202006014317, Mar. 13, 2008 (Year: 2008).*

(Continued)

*Primary Examiner* — Ryan J. Walters
(74) *Attorney, Agent, or Firm* — Jenkins, Wilson, Taylor & Hunt, P.A.

(57) ABSTRACT

A device for preparing a coffee product comprises a preparation chamber (135) which is intended and configured to receive and collect a quantity of ground coffee in a coffee bed (125), and pump means (15) for carrying water under increased pressure to the preparation chamber. The preparation chamber (135) is provided with a water inlet (136) for water at increased temperature and pressure on a first side of the coffee bed (125) and with an outlet (137) on an opposite side beyond the coffee bed (125). The outlet is coupled via a liquid conduit (20) to an outflow (6) at which the coffee product can be taken away. The device is provided with an electronic control system (17) which imposes a preparation cycle each time a product is prepared. Accommodated herein the liquid conduit (20) between the outlet (137) of the preparation chamber (135) and the outflow (6) at which the coffee product can be taken away is an adjustable restriction (30) with a passage (35) which is proportionally adjustable and controllable by the control system (17).

17 Claims, 6 Drawing Sheets

(51) Int. Cl.
*A47J 31/36* (2006.01)
*A47J 31/06* (2006.01)

(56) References Cited

FOREIGN PATENT DOCUMENTS

GB    2469873 A    11/2010
WO    WO 2016/110516 A1    7/2016

OTHER PUBLICATIONS

Dutch Search Report corresponding to Dutch Patent Application No. 2018804 dated Feb. 8, 2018.

\* cited by examiner

DEVICE FOR PREPARING A COFFEE PRODUCT

The present invention relates to a device for preparing a coffee product, comprising a preparation chamber which is intended and configured to receive and collect a quantity of ground coffee in a coffee bed, and provided with pump means for carrying hot water under increased pressure to the preparation chamber, wherein the preparation chamber is provided with a water inlet for admitting water at increased temperature and pressure on a feed side of the coffee bed, wherein the preparation chamber is provided with an outlet on a discharge side beyond the coffee bed, wherein the outlet is coupled via a product conduit to an outflow at which the coffee product can be taken away, and wherein the device is provided with an electronic control system which imposes a preparation cycle each time a product is prepared.

Such a device finds widespread application, for instance for household use, in an office environment or in a hospitality establishment. The device can optionally be provided here with a coffee grinder to which a bean reservoir for coffee beans is coupled, or comprise a holder for ground coffee. During the preparation cycle ground coffee is in both cases introduced into the preparation chamber and compressed to a coffee bed between two chamber bottoms. Hot water is then pressed under high pressure through the coffee bed in order to supply an extract for the desired coffee product. At the end of the preparation cycle the preparation chamber is thus released from the thus spent coffee and the preparation chamber is restored to its initial state.

The product received at the outflow can vary in quality and composition in accordance with the amount of coffee, the grind size and the compactness of the coffee bed after it has been pressed. It is nevertheless normally the intention per type of coffee product to produce a constant quality and composition wherein such unintended fluctuations are therefore undesirable. It would in addition be desirable to be able to prepare diverse coffee products with the same device.

The present invention has for its object, among others, to provide a device for preparing a coffee product which fulfils one or more of these wishes.

In order to achieve the stated object a device for preparing a coffee product of the type described in the preamble has the feature according to the invention that between the outlet of the preparation chamber and the outflow at which the coffee product can be taken away the product conduit comprises an adjustable valve device with an adjustable restriction, a smallest passage of which is proportionally adjustable and controllable by the control system. The invention is based here on the insight that during the preparation of a coffee product, in addition to the pressure and the temperature of the hot water, the retention time is also an important parameter for the final composition and quality of the product. At a given pump setting the pressure and retention time are determined by the resistance of the overall decoction system. By applying an adjustable restriction, and likewise resistance, in the outlet conduit of the preparation chamber this total resistance is no longer determined solely by the resistance of the coffee bed. Relatively small fluctuations in for instance the amount of dosed coffee, a possible pressing force on the coffee bed and the grind size or quality of the ground coffee, which would otherwise affect the pressure and the retention time significantly, thus become (relatively) less important factors. Applying an additional resistance in the system does after all make that of the coffee bed less important for the overall result. The invention hereby contributes toward a stable coffee quality of the end product.

By means of such a valve device with an adjustable restriction it is moreover possible to regulate the resistance of the system during preparation of the product. Disruptive influences, such as the above described almost inevitable fluctuations in the coffee bed, can thus be compensated. A preferred embodiment of the device has in this context the feature according to the invention that a flow sensor is provided therein in order to measure a magnitude of a volume flow of the product and to generate this as electronic value to the control system, wherein the control system regulates the restriction subject to the measured magnitude of the volume flow. Such a sensor can also be received directly in the outlet product conduit to the outflow instead of in the supply conduit for fresh water. A further particular embodiment of the device according to the invention therefore has the feature that the flow sensor is received between the outlet and the outflow in the product conduit. On the basis of the thus measured value of the product volume flow rate the control system opens the adjustable restriction to greater or lesser extent in accordance with a control value for the relevant product to be prepared prestored in a memory of the control system.

Because of the controllable restriction in the system the control system is thus able to regulate and control both the (counter-)pressure and retention time on the basis of the detected volume flow during dispensing of the product. It is possible here if desired to allow different profiles in accordance with a selection of the user, for instance coffee under low pressure for a milder taste similar to conventional filter coffee, as well as coffee under high (counter-)pressure for preparing an Italian espresso. A greater volume flow will normally take place at lower pressure, whereby the preparation time is moreover appreciably shortened. This provides for a relatively large amount of coffee in a relatively short time.

In a particularly practical embodiment the device according to the invention is characterized in that the valve device comprises the smallest passage in a liquid channel between a valve member and a valve housing, wherein a flow resistance of the liquid channel is controllable by the control system through an adjustment of the valve member relative to the valve housing. The resistance of the channel, and thereby the counter-pressure exerted by the channel, can thus be varied by such an adjustment of the valve member. This resistance depends on both a length and a cross-section of the channel and can therefore be made adjustable via either of these dimensions or via both by pinching the channel to greater or lesser extent or by lengthening or shortening the channel.

A particular embodiment of the device according to the invention has the feature that the valve member comprises a conical needle received fittingly in a passage opening of the valve housing, which needle is axially movable relative to the passage opening and is coupled for this purpose to an actuator controlled by the control system, and in a first extreme position at least substantially fully closes the passage opening and in a second extreme position leaves the passage opening at least substantially clear. The movement of the needle is driven and controlled automatically here by the control system which sets the actuator into operation accordingly. The needle can for instance be driven outward here subject to a detected volume flow in the device either upstream of the preparation chamber or downstream thereof.

In a further particular embodiment the device according to the invention has the feature here that the needle extends axially from a screw spindle which is received in an at least substantially complementary threaded cavity, wherein the screw spindle is coupled to an output shaft of an electric motor, in particular a stepping motor. By imparting more or fewer rotations to the spindle in the threaded cavity the needle coupled thereto can thus be carried axially further or less far into the passage, whereby the flow resistance of the restriction is adjustable. A preferred embodiment of the device has the feature here that an axially adjustable shaft part of adaptive length is provided between the screw spindle and the output motor shaft. The actuator can thus remain stationary irrespective of the depth of penetration of the spindle into the threaded cavity, this being an important advantage from a structural viewpoint.

In a further particular embodiment the device according to the invention is characterized in that the valve housing comprises a valve cavity and the valve member a valve body received close-fittingly therein, that the liquid channel is formed between an inner wall of the receiving cavity and an outer wall of the valve body, and that the valve body is adjustable relative to the receiving cavity. Through an axial translation and/or a radial rotation of the valve member in the valve cavity the channel can be left clear to greater or lesser extent here between an inlet and an outlet of the valve device, and the resistance of the channel can thus be set as required by the control system. A further particular embodiment of the device according to the invention has the feature here that the liquid channel extends in at least one groove in at least one of the inner wall of the valve cavity and the outer wall of the valve body received therein.

In a first further particular embodiment the device according to the invention is characterized in that a length of the channel is adjustable by an axial movement of the valve body to a position at least partially outside the valve cavity. The length of the restriction imposed on the product flow by the channel can thus be shortened, and the resistance thereof thereby reduced, by driving the valve body out of the valve cavity so that the path which the product flow must follow through the relatively narrow channel becomes shorter. A preferred embodiment of the device according to the invention has the feature here that the valve body comprises a cylinder body and that the groove runs helically in the outer wall thereof. Such a helical groove has a comparatively great length per running length of the valve body. A small adjustment of the valve body to a position outside the valve cavity hereby already has a significant influence on the resistance of the channel. The valve device can hereby be given a relatively compact form.

In a second further particular embodiment the device according to the invention has the feature that the groove extends from an outer end of the valve body in axial direction over at least a part of a length of the valve body in the outer wall thereof and narrows in doing so. The device according to the invention is more particularly characterized here in that the groove is V-shaped in both a lateral section and a cross-section and widens toward the outer end. Driving the valve body outside the valve cavity here will not particularly shorten the channel but rather narrow the smallest active section thereof as a result of the narrowing nature of the groove. The flow resistance of the valve device will hereby increase significantly.

A further preferred embodiment of the device according to the invention is characterized in that the restriction is at least substantially fully opened at least briefly within the preparation cycle. The restriction is at least substantially fully opened here for instance at the end of each preparation cycle so that a substantially unobstructed passage is obtained.

In the case of a controllable needle this means that the needle is moved out of the passage, whereby a relatively large opening is created. The risk of blockage of the previously relatively narrow passage as a result of coffee residue left behind therein can thus be limited to a minimum.

The device according to the invention likewise allows more variation in the preparation cycle of the coffee product. The invention particularly allows the system pressure and retention time to be varied during a preparation cycle in order to thus realize a different and/or better coffee quality. A further particular embodiment of the device according to the invention has for this purpose the feature that the control system imposes on the restriction a number of predetermined positions, each for a specific period of time, during a preparation cycle. Not just one pump pressure is thus imposed for a coffee product, on the contrary a pressure profile is implemented with a number of steps and associated step durations.

A particular embodiment of the device according to the invention more particularly has the feature that the control system comprises an electronic memory in which at least a recipe is stored which is retrievable by the control system and which defines the positions and an associated time duration within the preparation cycle. It is possible here to define different coffee products in terms of for instance dispensing quantity, retention time and pump pressure, among other parameters, and store them as recipes in the control system. The preparation of a coffee product is hereby raised to a higher level with such a device.

A further particular embodiment of the device has the feature here according to the invention that the control system comprises a user interface which enables a user to select a recipe from a number of recipes and assign this to the control system. This embodiment provides the user with an option of selecting a coffee product as desired and having it prepared by the device.

The invention will be further elucidated below on the basis of an exemplary embodiment and an accompanying drawing. In the drawing.

It is otherwise noted here that the figures are purely schematic and not all drawn to (the same) scale. Some dimensions in particular may be exaggerated to greater or lesser extent for the sake of clarity. Corresponding parts are designated in the figures with the same reference numeral.

Figure 1:
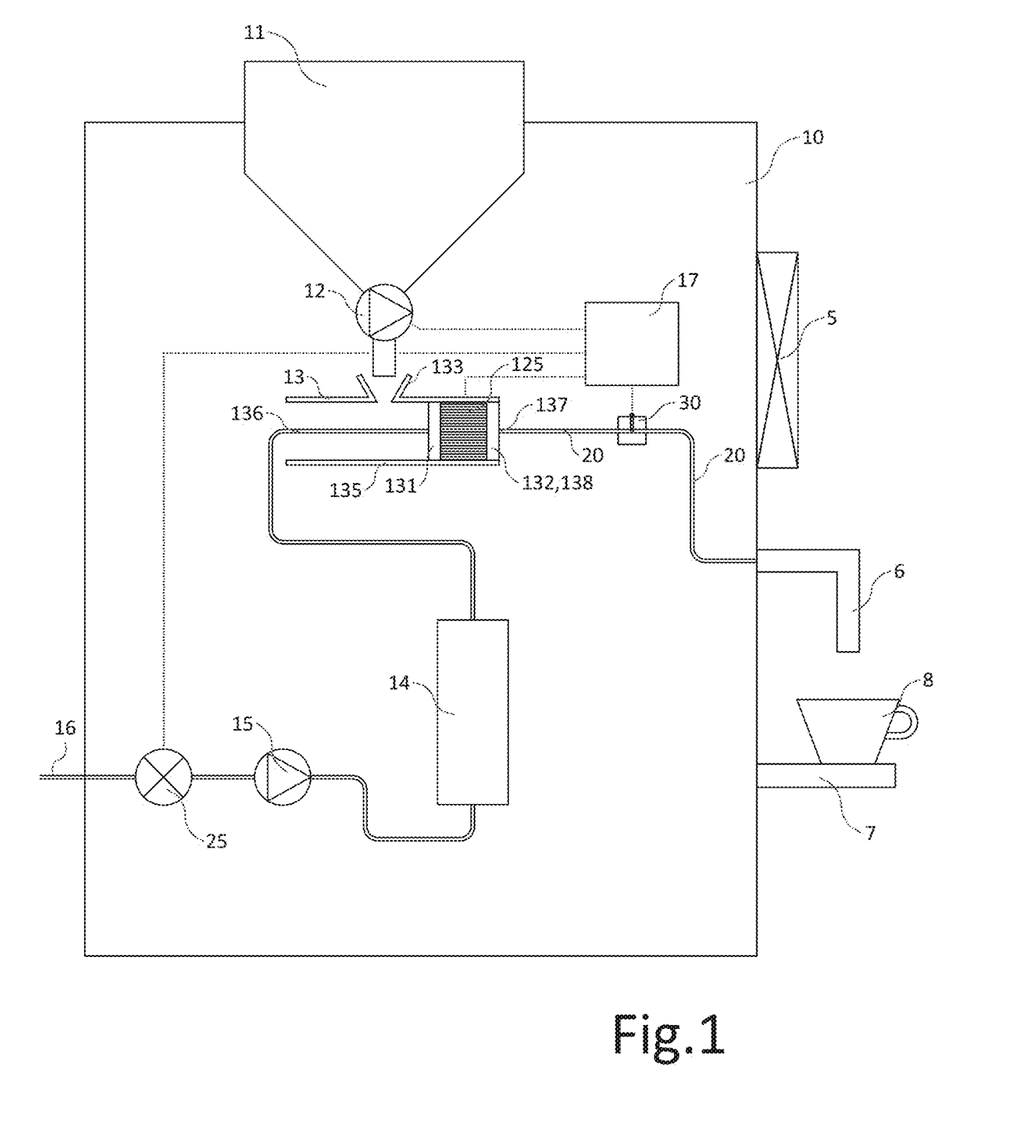
FIG. 1 shows schematically a structure of an exemplary embodiment of a device according to invention.

FIG. 1 shows a general structure of a device for preparing a coffee product under pressure from a coffee grind. Such a device is usually also referred to as a fully automatic espresso machine. The device comprises a compact housing 10 with a control panel 5 for a user with which the user can enter a number of selections, and an outflow 6 above a cup platform 7 from which the user can take a selected coffee product 8. This coffee product varies for instance from relatively strong, referred to as ristretto/espresso, to relatively diluted, referred to as coffee or lungo.

In the shown embodiment the device comprises a fixed water connection 16 for connection to a water mains, but can instead also be equipped with a water reservoir which must in that case be periodically refilled. An electronic flow sensor 25 continuously measures a liquid flow in the system and the admission of fresh water adjusted thereto. The device further comprises a bean reservoir 11 which debouches into a mouth of a coffee grinder 12 accommodated inside a housing 10 of the device. Instead of a single bean reservoir 11, the device can also be embodied with a number of bean reservoirs, for instance two, optionally each having a separate coffee grinder 12, each with a different type of coffee or solely for the purpose of increasing the supply in the machine. And instead of or in addition to being set for unground coffee beans, the device can also be set for processing ground coffee, in which case a coffee grinder can be omitted from the device. In addition, one or more additional reservoirs can optionally be provided in the housing for holding related soluble products which are introduced into the product to be prepared, such as for instance sugar, powdered milk (topping) and/or chocolate powder.

The device is controlled fully automatically by a central control system 17 which imposes a specific operating time on coffee grinder 12 and thus defines a coffee dosage. Via a filling opening 133 in a wall of a preparation unit 13 this dosage of ground coffee slides into a cylindrical preparation chamber 135 which is bounded on either side by opposite chamber bottoms 131,132. A first of the two chamber bottoms 131 is axially movable here in preparation chamber 135 to a position beyond filling opening 133 in order to thereby compress the received coffee powder 125 to a compact coffee bed 139. Also provided therein is an inlet 136 for hot water guided under increased pressure by means of a pump 15 from a boiler 14 or via throughflow heating to preparation chamber 135 and through coffee bed 125. The opposite chamber bottom 132 comprises a screen 138 which prevents coffee powder being able to escape from the preparation chamber. The opposite chamber wall 132 further comprises an outlet 137 which is connected via an outlet product conduit 20 to outflow 6 on the outer side of housing 10. At outflow 6 a coffee product extracted in the preparation chamber can be taken away, optionally supplemented with one or more of the above mentioned additives such as sugar and milk (powder). At the end of a preparation cycle the spent coffee bed 125 is ejected from preparation chamber 135 and preparation unit 13 is restored to its original initial state, ready for a subsequent preparation cycle.

A liquid pressure build-up of the liquid in the system during a preparation cycle depends on the flow resistance, and thereby the counter-pressure, in the device. This is determined in the first instance by the resistance of the compressed coffee bed 125 and hereby depends on the dosed quantity of coffee, the grind size (fineness) and the compactness of the bed (pressure force). In order that intended or unintended variations in one or more of these parameters have less influence on the final coffee quality, a controllable valve device 30 with an adjustable restriction therein is received in the outlet conduit 20 of the preparation chamber. This valve device 30 is shown in further detail in FIG. 2 and in cross-section in FIGS. 3A and 3B. A passage thereof is proportionally adjustable and controllable by control system 17.

Valve 30 is controlled during a preparation cycle from central control system 17 which also controls the other components of the system, such as for instance coffee grinder 12 and the preparation unit (decoction group) 13. The electronic flow sensor 25 is also coupled here to control system 17 in order to measure and generate an actual magnitude of the volume flow in the system as value to control system 17. A suchlike or similar sensor can also be received directly in the outlet product conduit 20 instead of in the supply conduit for fresh water. Control system 17 opens valve 30 to greater or lesser extent on the basis of the thus measured value of the product volume flow rate in accordance with a control value for the relevant product to be prepared prestored in a memory of control system 17.

Valve 30 comprises in this embodiment a needle valve with a conical needle 31 as valve member which protrudes fittingly in a passage opening 35 in valve housing 36 of valve 30 but which is axially movable therein in order to pinch passage opening 35 to greater or lesser extent or leave it wholly clear. In a first extreme position, see FIG. 3B, conical needle 31 protrudes into passage opening 35, and this latter is thus substantially fully closed, while in a second extreme position, see FIG. 3A, needle 33 is fully retracted from the passage opening in order to leave opening 35 completely clear.

Figure 2:
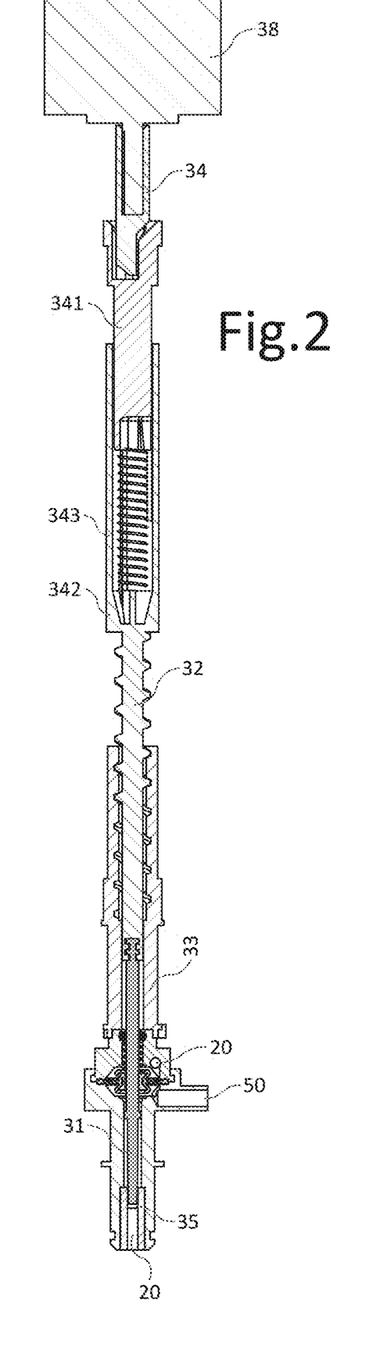
FIG. 2 is a detail drawing of an embodiment of an adjustable valve device as applied in the device of FIG. 1.

Needle 31 extends axially from a screw spindle 32 which engages in a corresponding spindle cavity 33, see also FIG. 2. Spindle 32 is coupled in turn to an actuator in the form of an electronic stepping motor 38 which is likewise controlled by control system 17. A shaft part 341,342 with an axially adjustable length is provided in coupling 34 between stepping motor 38 and spindle 32. This shaft part comprises for this purpose two mutually telescopic parts 341,342 which are driven apart by a spring 343 but which, counter to the spring pressure, can make a stroke toward each other which is sufficient to be able to displace the spindle 32 and needle 31 between a position wholly out of passage 35 of the valve and fully into passage 35. These extreme positions are shown in detail in the respective cross-sections of FIGS. 3A and 3B. All intermediate positions therebetween can also be set by proportional control of stepping motor 38.

Figures 3A, 3B:
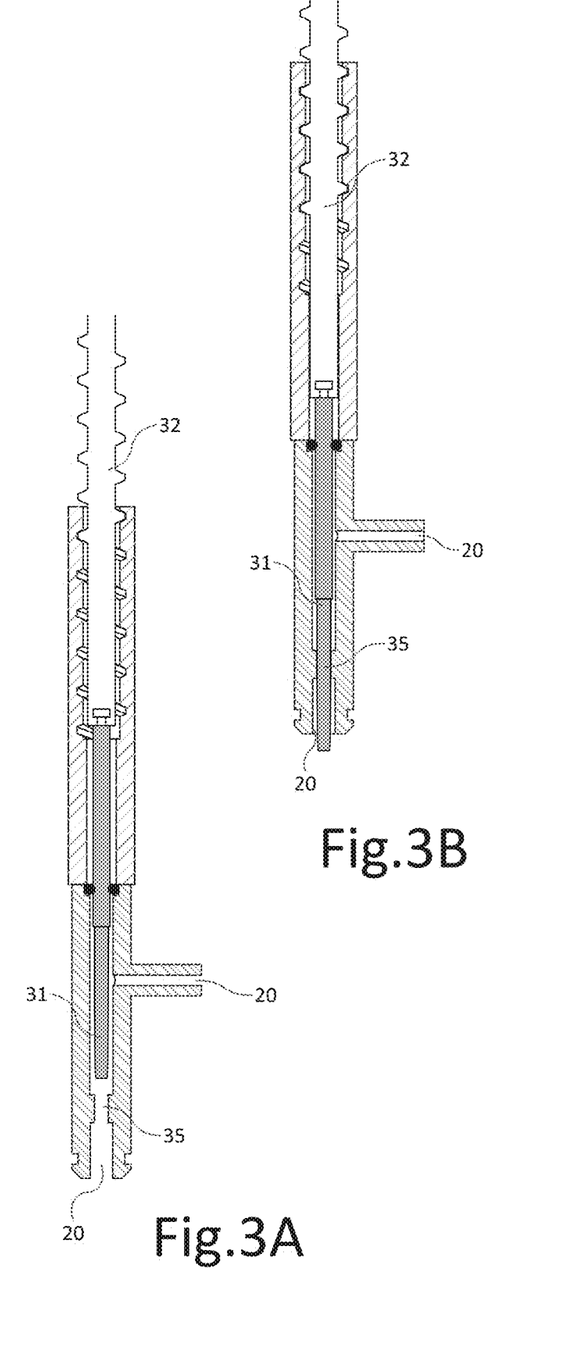
FIGS. 3A-B show cross-sections of the valve device of FIG. 2 in various positions.

Control system 17 drives needle 31 to greater or lesser extent outward on the basis of the volume flow measured by sensor 25 in order to thus adjust the system resistance of the device to and hold it at a value which is desired and predetermined as such. Different system resistances can optionally be utilized here during parts of a preparation cycle with a view to a desired coffee quality and/or coffee speciality. As a result of the resistance applied by valve 30 possible fluctuations in a resistance of coffee bed 125 thus have comparatively less influence on the overall resistance of the system and can be at least partially compensated by means of the controllable restriction.

At an end of a preparation cycle control system 17 preferably fully opens restriction 30 briefly in order to prevent scaling and blockage therein. For a thorough cleaning the device is moreover provided with a flush conduit wherein hot water can be guided from the boiler as flushing water through the system under the control of the control system. For the sake of clarity neither the flushing conduits and control valves applied for this purpose nor a system of control valves in the decoction system are further shown in FIG. 1, but are also present in reality.

Figure 4:
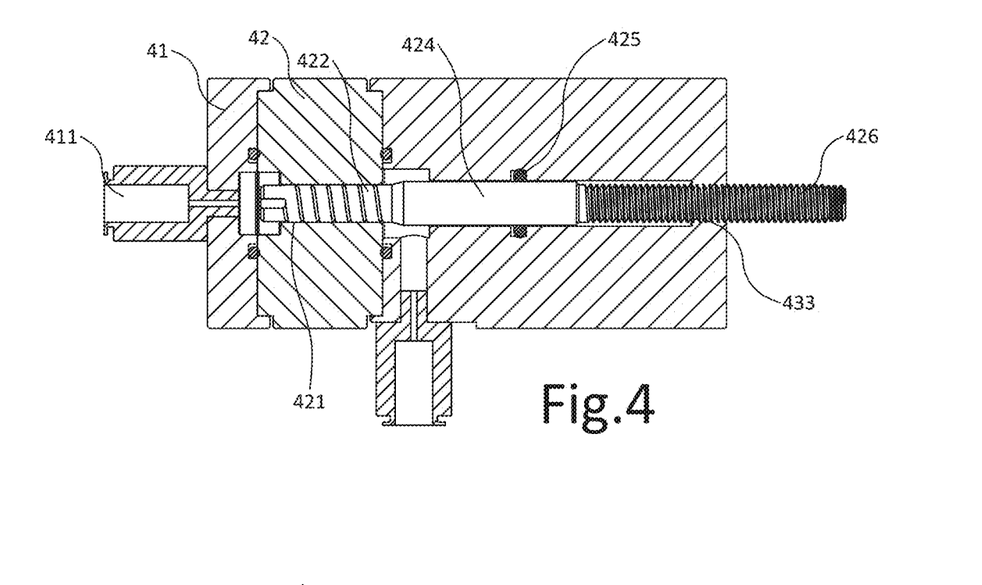
FIG. 4 shows in cross-section a second embodiment of an adjustable valve device as can be applied in the device of FIG. 1.

The present invention is by no means limited to application of the valve device shown in FIG. 2. Shown therefore by way of example in FIG. 4 is an alternative valve device which can be applied within the scope of the invention. The valve device here comprises an integral system component with an inlet chamber 41, a valve housing 42 and an outlet chamber 43 which connect seamlessly to each other and are connected liquid-tightly to each other via gaskets provided for the purpose. Inlet chamber 41 comprises a connection 411 for product conduit 20 upstream of the valve, while a corresponding connection 433 is provided on outlet chamber 43 for a downstream connection of product conduit 20.

Present in valve housing 42 is a central bore 421 in which a valve member 422 is axially movable in close-fitting manner. The valve member essentially comprises a cylindrical valve body which is provided in a peripheral wall with a groove 423 which spirals around a cylinder axis of the body. Groove 423 thus forms a liquid channel which runs helically with a pitch and at an angle between an inner wall of bore 421 and the peripheral wall of valve body 422. This channel is longer per running millimetre of valve body 422 by being given a smaller pitch and/or a greater inclination to the cylinder axis; at a larger pitch and/or smaller inclination this channel will be comparatively shorter per running millimetre of valve body 422.

Valve body 422 extends from a retaining needle 424 which protrudes through a bore of outlet chamber 43 and closes leakage-tightly therein via an O-ring 425. Retaining needle 424 is in turn coupled to a threaded end 426 with a defined pitch. The threaded end is received in a complementary threaded bore of outlet chamber 433 and driven by a stepping motor (not shown). A rotation of the stepping motor is thus translated into an axial displacement of valve body 422 in valve cavity 421, this displacement being determined by the pitch of threaded end 426.

Figure 5A:
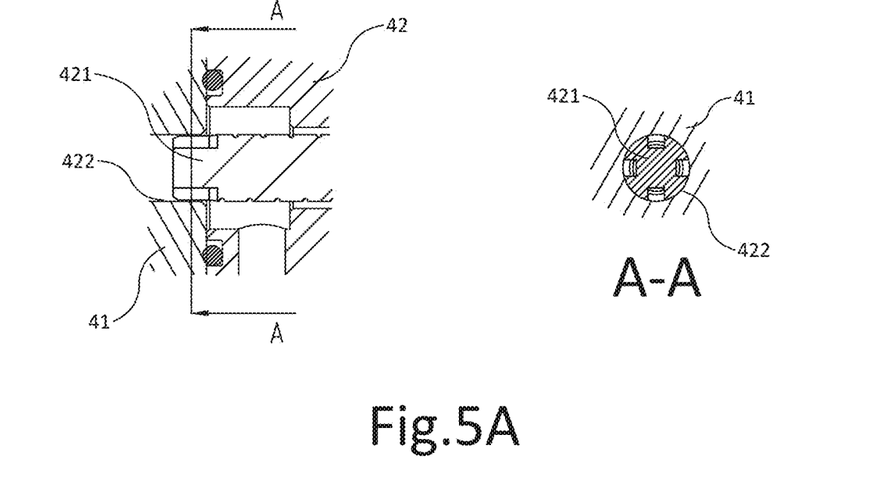
FIGS. 5A-D show the valve device of FIG. 4 in different positions.
Figure 5B:
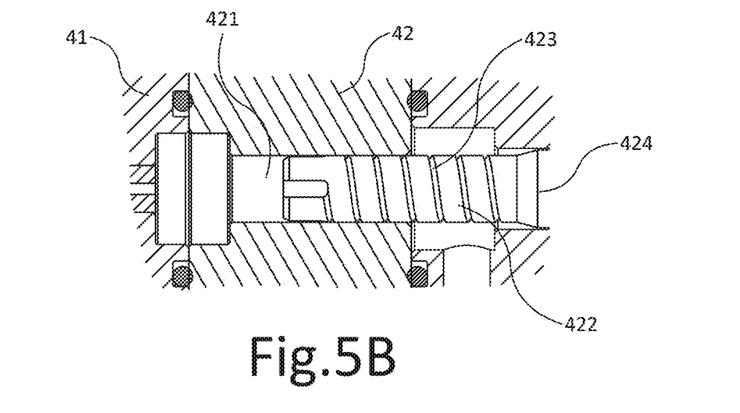
Figure 5C:
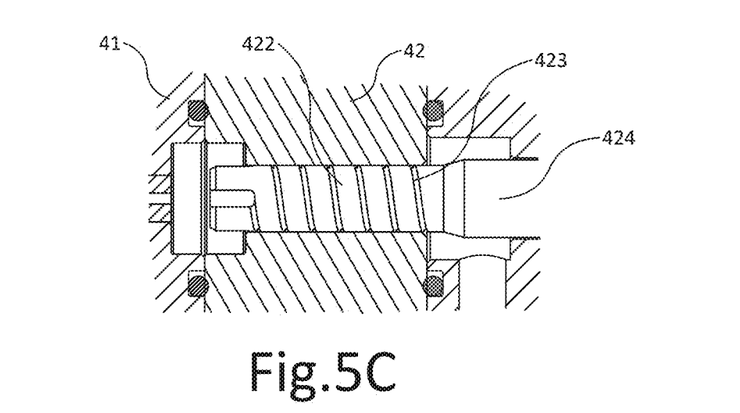
Figure 5D:
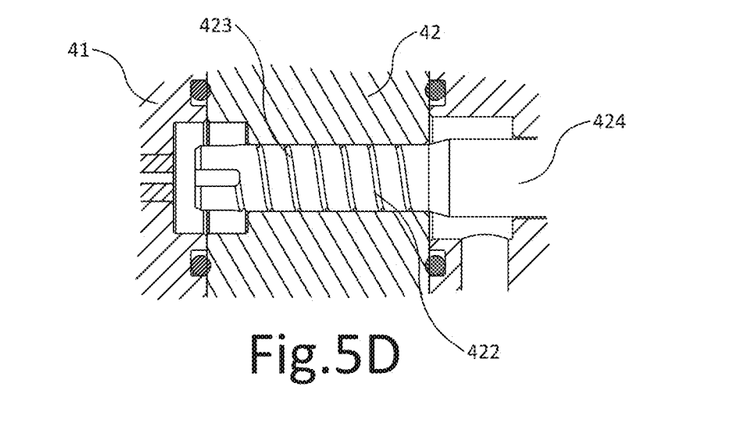

As a result of this axial displacement valve body 422 protrudes further or less far into valve cavity 421. This is shown for different positions in FIGS. 5A-5D. In a first extreme position, FIG. 5A, the valve body still lies wholly outside valve cavity 421 and the valve offers no resistance at all. The valve is now fully open. When however valve body 422 is received in the valve cavity, FIG. 5B, the liquid is forced through the helical channel formed between the inner wall of cavity 421 and an outer wall of valve body 422 by the groove 423 arranged therein. The flow resistance hereof depends on an active cross-section, transversely of the liquid flow, of the channel in combination with a length of the channel. This latter is determined by the extent to which the valve body protrudes into the valve cavity, and is therefore proportionally adjustable during operation of the device. The stepping motor is controlled for this purpose by control system 17. A variation in this resistance per revolution is determined here by the variation caused thereby in the length of the liquid channel, which is in turn imposed by the pitch and inclination of the helix along which the groove 423 runs in the wall of the valve body. This resistance is maximal in the situation shown in FIG. 5C, wherein the liquid has to follow the full path through groove 423; while in FIG. 5D the valve is even fully closed because groove 423 ends here against the wall of valve cavity 421.

Control system 17 drives valve body 422 further or less far outward on the basis of the volume flow measured by sensor 25 in order to thus adjust the system resistance of the device to and hold it at a value which is desired and predetermined as such. Different system resistances can optionally be utilized here during parts of a preparation cycle with a view to a desired coffee quality and/or coffee speciality.

Figure 6A:
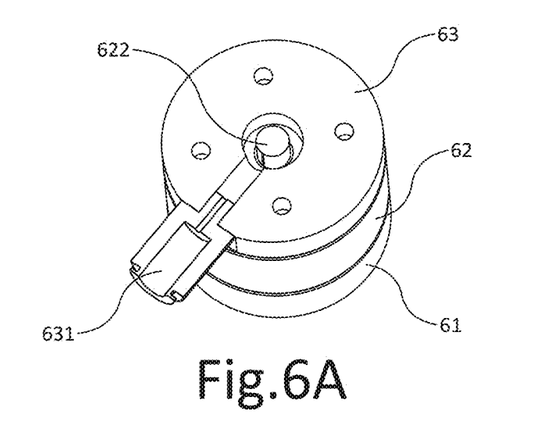
FIGS. 6A-C show perspective views of a further embodiment of an adjustable valve device as can be applied in the device of FIG. 1 in different positions.
Figure 6B:
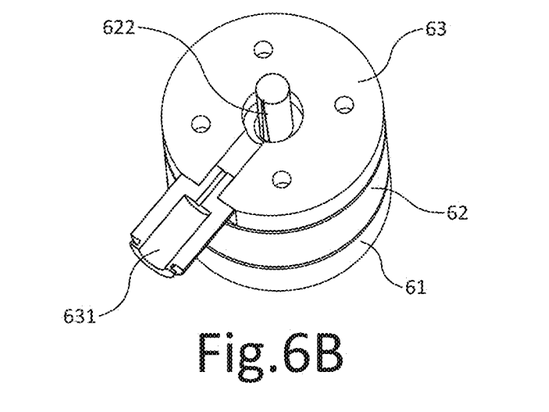
Figure 6C:
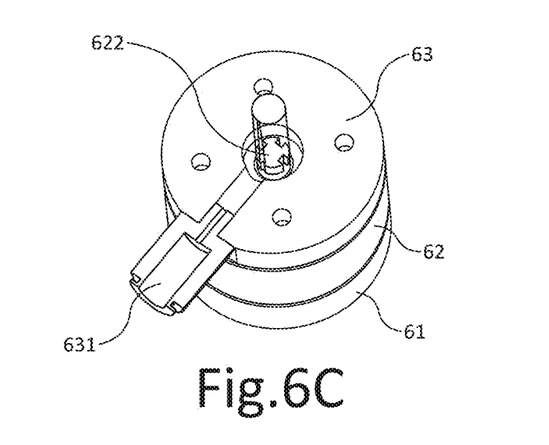
Figure 6D:
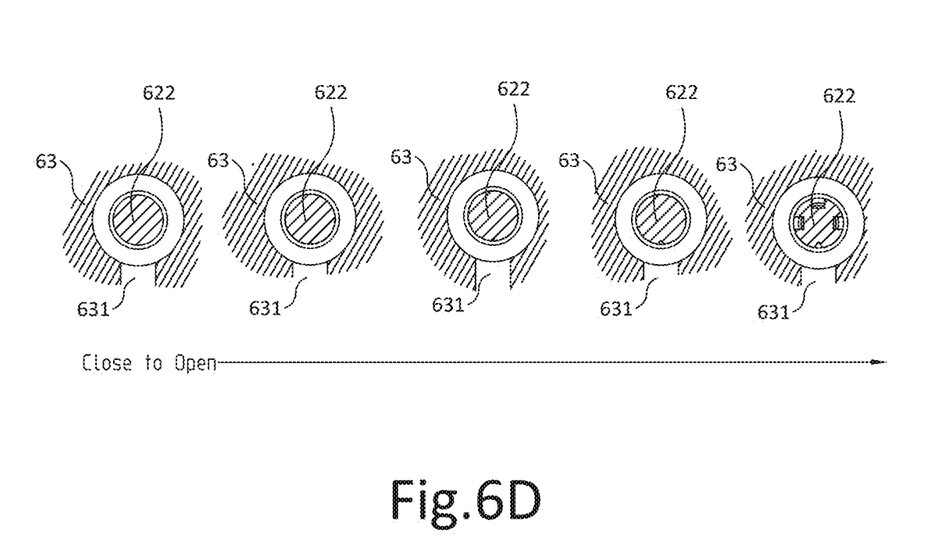
FIG. 6D shows a cross-section of the adjustable valve device of FIGS. 6A-6C at successive stages with a passage increasing in size.
Figure 7:
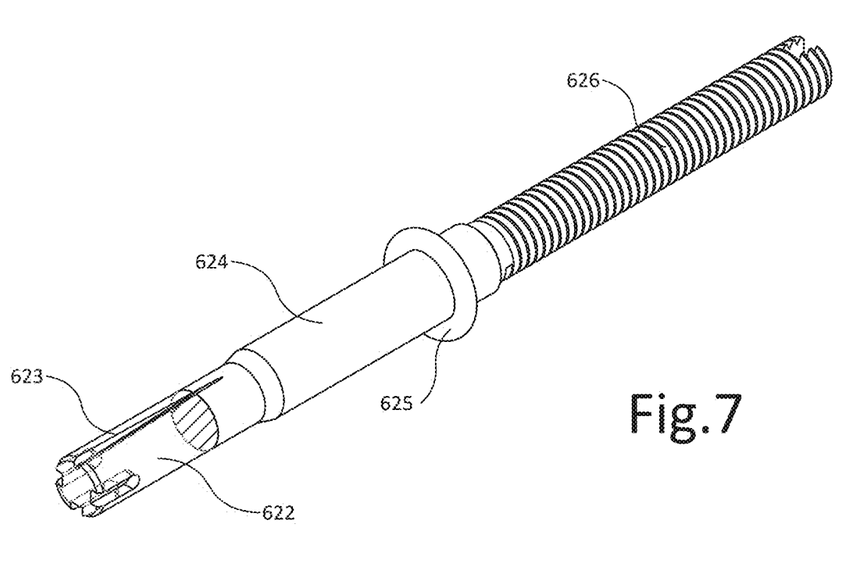
FIG. 7 is a detail drawing of the valve member of the valve device of FIGS. 6A-6D.

A third variant of the valve device is shown in FIGS. 6A-6C in association with FIG. 7. The rough structure of the valve device is similar to that of the second embodiment with an inlet chamber 61, a valve housing 62 and an outlet chamber 63 on which a downstream connection 631 for product conduit 20 is provided. The inlet chamber has a corresponding upstream connection not shown in the drawing.

Protruding in this embodiment into a central bore 631 of the valve housing is a needle 632 which is received close-fittingly therein but which is axially movable therein. At an outer end one or more V-shaped grooves 623 are arranged in a peripheral wall of this needle 622, see also FIG. 7. This groove or grooves 623 open at a free end of needle 622 into outlet chamber 63 and thus define a liquid channel imposed on the liquid.

In similar manner as in the second exemplary embodiment needle 632 extends via a shaft part 624 from a threaded end 626 which is coupled to a stepping motor. An O-ring 625 here provides a desired liquid barrier in valve cavity 631. The stepping motor is controlled by control system 17 of the device, whereby needle 622 is released further or less far from valve cavity 631. Not only a length of the channel but also an average active width/cross-section is thus adjusted proportionally. As shown in enlarged view in FIG. 7, the V-groove or V-grooves narrow further inward from the free distal end of needle 622, whereby the active cross-section of the groove or grooves 623 gradually becomes narrower/smaller in this direction. A proportional fine adjustment of the liquid resistance of the valve is thus possible, varying from the fully closed situation shown in FIG. 6A to the substantially opened situation shown in FIG. 6C. Between these the valve can be pinched proportionally, such as in the half-open situation shown in FIG. 6B.

Although the invention has been further elucidated above on the basis of only several exemplary embodiments, it will be apparent that the invention is by no means limited thereto. On the contrary, many variations and embodiments are still possible within the scope of the invention for a person with ordinary skill in the art.

The invention claimed is:

1. A device for preparing a coffee product, comprising a preparation chamber which is intended and configured to receive and collect a quantity of ground coffee in a coffee bed, and provided with pump means for carrying hot water under increased pressure to the preparation chamber, wherein the preparation chamber is provided with a water inlet for admitting water at increased temperature and pressure on a feed side of the coffee bed, wherein the preparation chamber is provided with an outlet on a discharge side beyond the coffee bed, wherein the outlet is coupled via a product conduit to an outflow at which the coffee product can be taken away, and wherein the device is provided with an electronic control system which imposes a preparation cycle each time a product is prepared, wherein between the outlet of the preparation chamber and the outflow at which the coffee product can be taken away the product conduit comprises an adjustable valve device with an adjustable restriction, a smallest passage of which is proportionally adjustable and controllable by the control system, wherein the valve device comprises a valve cavity between an inlet and an outlet of the valve device as a portion of the product conduit, wherein the valve device comprises a valve member that protrudes axially in the valve cavity between an inlet and an outlet of the valve cavity, wherein the valve member is displaceable between the inlet and the outlet of the valve cavity, and wherein a flow resistance of the portion of the product conduit is controllable by the control system through a displacement of the valve member within the valve cavity.

2. The device as claimed in claim 1, wherein a flow sensor measures a magnitude of a volume flow of the product and delivers this as electronic value to the control system, wherein the control system displaces the valve member subject to the measured magnitude of the volume flow.

3. The device as claimed in claim 2, wherein the flow sensor is received between the outlet of the preparation chamber and the outflow in the product conduit.

4. The device as claimed in claim 1, wherein the valve member comprises a conical needle received fittingly in a passage opening of the valve housing, which needle is axially movable relative to the passage opening and is coupled for this purpose to an actuator controlled by the control system, wherein the valve member substantially closes the passage opening in a first extreme position, and wherein the valve member substantially clears the passage opening in a second extreme position.

5. The device as claimed in claim 4, wherein the needle extends axially from a screw spindle which is received in an at least substantially complementary threaded cavity, wherein the screw spindle is coupled to an output shaft of an electric motor.

6. The device as claimed in claim 5, wherein an axially adjustable shaft part of adaptive length is provided between the screw spindle and the output motor shaft.

7. The device as claimed in claim 5, wherein the electric motor is a stepper motor.

8. The device as claimed in claim 1, wherein the portion of the product conduit extends in at least one groove in at least one of the inner wall of the valve cavity and the outer wall of the valve member that is received therein.

9. The device as claimed in claim 8, wherein a length of the portion of the product conduit is adjustable by an axial displacement of the valve member within the valve cavity.

10. The device as claimed in claim 8, wherein the valve member comprises a cylinder body and wherein the groove runs helically in an outer wall thereof.

11. The device as claimed in claim 8, wherein the groove extends in an axial direction from an extreme end of the valve member over at least a part of a length of the valve member in the outer wall thereof and narrows down in the axial direction.

12. The device as claimed in claim 11, wherein the groove is V-shaped in both a lateral section and a cross-section and widens toward the outer end.

13. The device as claimed in claim 1, wherein the restriction is opened at least briefly within the preparation cycle.

14. The device as claimed in claim 1, wherein the control system imposes on the restriction a number of predetermined positions, each for a specific period of time, during a preparation cycle.

15. The device as claimed in claim 14, wherein the control system comprises an electronic memory in which at least a recipe is stored which is retrievable by the control system and which defines the positions and an associated time duration within the preparation cycle.

16. The device as claimed in claim 15, wherein the control system comprises a user interface which enables a user to select a recipe from a number of recipes and assign this to the control system.

17. The device as claimed in claim 1, wherein the portion of the product conduit extends between an inner wall of the valve cavity and an outer wall of the valve body, and wherein the smallest passage of the restriction is defined by and between the valve body and the inner wall of the valve cavity.

* * * * *